(12) United States Patent
Jacobs (10) Patent No.: US 7,756,738 B2
(45) Date of Patent: Jul. 13, 2010

(54) PROFESSIONAL SERVICE MANAGEMENT USING PROJECT-BASED POINT SYSTEM

(75) Inventor: Ron Jacobs, Cupertino, CA (US)

(73) Assignee: Lumen Patent Firm, Palo Alto, CA (US)

( * ) Notice: Subject to any disclaimer, the term of this patent is extended or adjusted under 35 U.S.C. 154(b) by 1171 days.

(21) Appl. No.: 11/188,239

(22) Filed: Jul. 21, 2005

(65) Prior Publication Data
US 2007/0022001 A1    Jan. 25, 2007

Related U.S. Application Data

(60) Provisional application No. 60/601,581, filed on Aug. 12, 2004.

(51) Int. Cl.
*G06F 9/46* (2006.01)
(52) U.S. Cl. .................................. 705/8; 705/11
(58) Field of Classification Search .............. 705/8, 705/11
See application file for complete search history.

(56) References Cited

U.S. PATENT DOCUMENTS

| | | | |
|---|---|---|---|
| 6,055,511 A | 4/2000 | Luebbering et al. | 705/14 |
| 6,073,108 A * | 6/2000 | Peterson | 705/8 |
| 6,477,533 B2 | 11/2002 | Schiff et al. | 707/10 |
| 6,622,128 B1 | 9/2003 | Bedell et al. | 705/30 |
| 6,662,164 B1 * | 12/2003 | Koppelman et al. | 705/14.13 |
| 6,681,210 B2 | 1/2004 | Kelly | 705/32 |
| 7,076,439 B1 * | 7/2006 | Jaggi | 705/9 |
| 7,171,365 B2 * | 1/2007 | Cooper et al. | 704/275 |
| 7,222,086 B2 * | 5/2007 | Huffman | 705/11 |
| 2001/0042032 A1 * | 11/2001 | Crawshaw et al. | 705/32 |
| 2003/0225610 A1 * | 12/2003 | Doyle | 705/11 |
| 2005/0049903 A1 * | 3/2005 | Raja | 705/7 |

OTHER PUBLICATIONS

Sensible Cinema Software, Advocate Office Classic—Uniform Task-Based Management System Jul. 23, 2003 http://www.sensiblecinema.com/advocate/Uniform%20Task%20Based%20Management%20System.htm.*

Sensible Cinema Software discloses on it website (http://www.sensiblecinema.com/advocate/Uniform%20Task%20Based%20Management%20System.htm.).*

Leong, Cheryl. "Food Project." 1997. Dartmouth University. http://engineering.dartmouth.edu/teps/images/food.pdf.*

Austin-Holland, Christian and Ramirez, Ellis B. "Negotiation Strategies: Insights Cleaned from PAIR Data Analysis." Intellectual Property Today May 2002. p. 20 Print.*

(Continued)

*Primary Examiner*—Beth V Boswell
*Assistant Examiner*—Renae Feacher
(74) *Attorney, Agent, or Firm*—Lumen Patent Firm (57) ABSTRACT

A computer-implemented project-based point system for professional services uses a database including a list of professional employees, a menu of project codes, and an assignment of a point value to each of the project codes. The method calculates total points earned by a professional by adding point values assigned to project codes of completed projects, which may be billable and/or non-billable projects. The calculated total points earned by the professional may be compared to a point requirement, whereby the performance of the professional may be evaluated. In addition, the method may calculate a total charge to a client for professional services by adding fixed fees assigned to project codes of completed billable projects.

12 Claims, 3 Drawing Sheets

OTHER PUBLICATIONS

Akin, Gump and Wolinsky, Scott. "An Inside Look at the Patent Examination Process." The Metroplitan Corporate Counsel Sep. 2002 Northeast Edition, p. 18. Print.*

American Bar Association, "ABA Commission on Billable Hours Report," 2001-2002.

Ward Bower, "Abandon the Billable Hour Culture," Altman Weil, Inc., [retrieved on Jul. 18, 2005]. Retrieved from the Internet: <URL: http://www.altmanweil.com/about/articles/article. cfm?ArticleID=149>.

Abacus, "Abacus BackOffice Getting Started Guide," 2003, pp. 1-134.

Association of Corporate Counsel, "Alternative Billing," [retrieved on Jul. 18, 2005]. Retrieved from the Internet: <http://www.acca.com/infopaks/billing.html>.

Richard C. Reed, "Alternative Billing and Pricing Methods," [retrieved on Jul. 18, 2005]. Retrieved from the Internet: <http://www.altmanweil.com/about/articles/article.cfm?ArticleID=119>.

DDI Products & Services, "Task Based Billing," [retrieved on Jul. 18, 2005]. Retrieved from the Internet: <http://www.ddisoft.com/taskbase.htm>.

Los Angeles Community Colleges Office of the Chancellor Administrative Regulations, "Unit-Based Billing," Jan. 10, 2002, pp. 1-6.

In the Supreme Court of the State of Montana, "In the Matter of the Rules of Professional Conduct and Insurer Imposed Billing Rules and Procedures," Appendix to Memorandum in Support of Application for Original Jurisdiction and Complaint for Declaratory Relief.

Howard L. Mudrick, "Partner Compensation," The CPA Journal [retrieved on Jul. 18, 2005]. Retrieved from the Internet: <http://www.nysscpa.org/cpajournal/old/08656260.htm>, pp. 1-8.

John P. Weil & Company, "Partner/Shareholder Compensation Techniques," [retrieved on Jul. 18, 2005]. Retrieved from the Internet: <http://weilandco.com/new/compensa.html> pp. 1- 4.

Department of Energy, "Performance-Based Contracting," Jun. 1998, Revised May 2000.

Danna Mayhall, "Alternative Billing, Task-Based Billing for the Small Firm Practitioner," ProDoc, [retrieved on Jul. 18, 2005]. Retrieved from the Internet: <http://www.prodoc.com/alt_billing/danna_mayhall/index.asp>.

The Young Lawyer, "Step Away from the Billable Hour Try Alternative Billing Methods," [retrieved on Jul. 18, 2005]. Retrieved from the Internet: <http://www.abanet.org/yld/tyl/mar98bill.html> pp. 1-3.

The Canadian Bar Association, "The Future of the Legal Profession: The Challenge of Change," Aug. 2000, A Report of the Young Lawyers' Conference.

Gary R. Gordon, "Uniform Task Based Management System," Advocate 2002, [retrieved on Jul. 18, 2005]. Retrieved from the Internet: <http://www.advocate2002.com/Advocate/Uniform%20Task%20Based%20Management%20System.htm> pp. 1-10.

Winand Emons, "Expertise, contingent fees, and insufficient attorney effort," International Review of Law and Economics 20 (2000) 21-33.

* cited by examiner

PROFESSIONAL SERVICE MANAGEMENT USING PROJECT-BASED POINT SYSTEM

CROSS-REFERENCE TO RELATED APPLICATIONS

This application claims priority from U.S. provisional patent application No. 60/601581 filed Aug. 12, 2004.

FIELD OF THE INVENTION

The present invention relates generally to systems and methods for managing work performed by employees. More specifically, it relates to computerized systems and methods that assign fixed point values to predefined projects performed by salaried employees working in a professional service firm.

BACKGROUND OF THE INVENTION

There are many computerized systems for managing projects and employees in professional service firms, such as a law firms and engineering firms. Perhaps the best known and most widespread system is based on the billable hour. This system normally is implemented both internally within the firm as a method for employee management and externally outside the firm as a method for billing clients.

Internally, the billable hour system is used to keep track of the number of billable hours that each professional employee works for the firm on client cases. Many firms track the number of billable hours per month performed by each employee and evaluate the employee performance in large degree based on their total number of billable hours. In fact, many firms include as part of the employment contract a requirement that the employee work a minimum number of billable hours each month. Internal management decisions relating to employee promotions, salary raises, bonuses, and the like are often based on the billable hours that are tracked within the firm as the sole measure of employee performance.

On the other hand, the billable hour system is also used by professional firms as a method for determining the fees charged to clients outside the firm. The firm normally sets one or more hourly billing rates and charges a client based on the number of hours of service performed for the client on its cases. Charges to clients external to the firm are thus based on the billable hour system as well.

Despite its widespread use, the billable hour system has many problems with both its internal and external aspects. Internally, the billable hour system as a method of evaluating employee performance discourages employees from spending time on personal professional development and business development, and it promotes a work ethic that values quantity of work over quality of work. Because employees are evaluated based on the quantity of hours spent, the system discourages employees from performing work more efficiently. For example, an inexperienced and inefficient employee who spends a long time completing a project is paid more than an experienced and efficient employee who completes the work quickly, thereby discouraging employees from improving their work efficiency. Lack of efficiency then leads to the need for management to monitor time reported by employees to determine whether all the time logged by the employees is actually billable. Moreover, because quantity of service is internally valued over quality of service, the firm may become more vulnerable to professional liability and may lose valuable clients. The billable hour system also consumes employee time logging and reporting every minor task performed and its associated client case. In addition to consuming time, this reporting distracts the employee from concentrating on the actual service being performed. Moreover, under the billable hour system, management also has the burden of tracking employee vacation time. Existing computerized systems to assist in the management of projects and employees are generally limited to the billable hour system, and therefore embody and perpetuate these problems.

The billable hour system as a method of billing clients external to the firm also suffers from various problems. For example, often there arises the need for management to review and correct invoices in order to determine whether all the reported employee time can be reasonably billed to clients. While the employee is motivated to report large numbers of hours, management needs to ensure that the hours invoiced can be reasonably justified to the client. Because of these conflicting interests, the billable hour system consumes valuable management time reviewing invoices, determining whether the time is justified, and correcting the invoices. Another problem is that billing clients by the hour generates complex invoices that lack simplicity and transparency, resulting in frequent requests from clients to discuss or dispute specific charges or number of hours. In an effort to control their costs, some clients pressure firms to adopt specific invoice formats and billing practices. These demands are very burdensome to the firms, especially when they involve various distinct and changing invoicing requirements imposed by different clients. Even with a uniform set of industry-wide task codes to categorize standardized tasks or deliverables, the invoices are still complex and often result in discussion and dispute of various small line-item details. Invoices containing a large number of detailed items also has the disadvantage of giving the client a sense of being 'nickel-and-dimed' for many minor tasks performed within the firm, distracting them from the primary deliverable being provided. Existing computerized systems to assist in the invoicing of projects to clients are generally designed for the billable hour system, and therefore perpetuate these problems.

To avoid some of these significant problems with the billable hour system, some firms have adopted a simpler project-based billing system that charges clients a standardized fixed fee (also called a flat fee) for a given service or deliverable, regardless of the time spent performing it within the firm. The fixed fee system, however, solves only the external problems caused by the billable hour system. Firms that bill fixed fees externally to clients typically continue to use the billable hour system internally to track and manage employee performance, especially since computerized systems to assist and automate project and employee management are designed to conform to the billable hour system. Thus, the significant internal problems created by the billable hour system are not solved by merely switching to a fixed fee client billing system.

To address some of the internal problems created by the billable hour system, some firms have introduced mechanisms to counteract its shortcomings. For example, some firms award a bonus or profit share to supplement the employee salary based on various factors including employee-generated revenue or profitability, commissions, client development and retention, business development, firm management or administration, seniority, and level of expertise. Other firms award employees credit hours that count toward their minimum billable hour requirement whenever they perform certain activities such as mentoring, business/client development, and education/professional development. These systems, however, merely introduce countermeasures to the billable hour system. They do not dispense with or replace the billable hour system for employees.

Consequently, many of the fundamental internal problems created by the billable hour system remain. For example, the system still values quantity over quality as a measure of performance, still discourages employees to perform work efficiently, still requires management to review time reported by employees to ensure that it is reasonable, and still consumes valuable employee time logging time. Moreover, because computerized systems are designed to use the billable hour to manage projects, employees, and client charges, attempts to depart from the billable hour system are often difficult or impossible to implement using such systems.

Many of the above systems for billing clients and evaluating employee performance are implemented using a computer database and associated programs or scripts. The implementation may be a single integrated database and application program or may be separate databases and programs that exchange or share information. In any case, the computer-implementation of the system suffers from the inherent limitations of the assumptions that underlie the organization and design of the system. Thus, the usefulness of existing computerized implementations of employee management systems is limited by the problems of the billable hour system that is built into them. There is thus an outstanding need to provide a new computerized system for employee management that overcomes the problems with existing systems.

SUMMARY OF THE INVENTION

The invention provides a system for the management of salaried professional employees and computerized implementation thereof. In contrast to billable hour systems, the present system does not require the firm or its employees to keep track of time spent on various projects and, consequently, the system does not suffer from the associated internal problems with the billable hour system. Instead, the system uses a project-based point system wherein predetermined, fixed point values are associated with a standardized list of well-defined projects. A project is defined in the context of the present disclosure as a package of tasks or services that are routinely performed by an employee in the course of producing a well-defined deliverable to a client. For example, in a patent firm, the preparation of a patent application is a project which routinely involves performing a collection of standard tasks and results in a well-defined deliverable: a patent application. Completing a patent application project might involve performing any number of standard tasks such as searching for and reviewing prior art, interviewing the inventor, drafting claims, preparing drawings, writing the specification, discussing a first draft with the inventor, finalizing the application, preparing filing documents, and filing the patent application. A prior art search is an example of a smaller project whose deliverable is a search report. Projects performed for the general benefit of the firm also involve a typical set of tasks and a well-defined deliverable. For example, when an employee brings a new client to the firm, this typically involves tasks such as networking, meetings, and sending marketing materials. The deliverable is the signed engagement agreement. The present project-based point system assigns value appropriately by correlating projects and their fixed point values with a package of tasks that result in a well-defined deliverable to a client. Awarding points to employees based on project completion not only values efficiency and quality, but also has the advantage of giving incentives to employees to complete projects so that the firm can invoice clients for the deliverable. In contrast, a billable hour system assigns value to time spent regardless of the quality or efficiency of the work being performed, and regardless of whether or not any deliverable is generated by the employee.

A computer-implementation of the system may use, for example, a database with various user interfaces and scripts. In the database each type of project is associated with a predetermined, fixed number of points, and the employee who completes a project earns the associated points, irrespective of the time spent by the employee on the project. The projects may be projects billable at a flat fee performed for specific clients of the firm. The projects may also include non-billable projects performed for the general benefit of the firm, in which case the employee earns bonus points (also called reward points). For example, an employee may earn points by bringing in a new client to the firm, or receiving a special request from a satisfied client to work on a new project. An employee may also receive reward points by assisting another employee on a project, performing management tasks for the firm, or performing business development tasks.

Rather than evaluating employee performance by the quantity of hours worked, in this system employees may be evaluated based on the points associated with the projects they complete regardless of the amount of time spent. Consequently, in contrast with the billable hour system, employees have an incentive to work efficiently on their projects and experienced employees are rewarded for increased efficiency. In addition, higher quality work and client satisfaction is promoted by granting reward points to employees, e.g., when a client sends new projects to the employee or explicitly requests that the employee work on their cases. Moreover, employees enjoy the incentive to earn reward points for performing other tasks that benefit the firm without necessarily directly generating revenue from clients, e.g., professional development, business development, management, and assisting coworkers with projects. Thus, this project-based point system not only promotes work efficiency and quality, but also promotes a team-oriented firm culture. Moreover, the project-based point system encourages employee independence and self-management, thereby reducing the demand upon supervisors. Employees naturally have an incentive to ensure that work is being performed efficiently and with quality and care to maintain good client satisfaction. The project-based point system also eliminates the burden of tracking time spent on projects. Moreover, there is no need to track the accumulation of vacation time. Instead of accumulating time, employees accumulate points. These points are correlated not to the time worked, but rather to the projects completed. An employee who efficiently completes projects earns points more quickly and naturally enjoys more leisure time.

Because this project-based point system does not keep track of billable hours internally, it is well-suited to be used with the simpler fixed rate (a.k.a. flat rate) client billing scheme, with all its associated advantages. The project-based point system may be implemented using a database that keeps track of projects, points, employees, and clients. It may additionally keep track of flat fees and generate or assist with creating invoices. The database may also be used to generate for clients periodic case history reports that include active and completed projects (i.e., deliverables) associated with each case and the current status of cases and/or projects. In a preferred embodiment, the report is automatically generated in electronic form and sent to the client.

In one aspect, the invention provides a computer-implemented method for implementing a project-based point system for managing professional employees. The method includes storing in a computer-readable digital storage medium a database. The database includes a list of employee identifiers corresponding to salaried professionals employed by a service firm and paid a salary. The database also includes a menu of project codes corresponding to predefined projects routinely performed by the professionals of the service firm. Each of the predefined projects involves the performance of a collection of typical tasks resulting in a predetermined deliverable for the project. The database also includes a set of point values assigning a fixed point value to each of the project codes. The method calculates total points earned by a professional in a specified time period by adding point values assigned to project codes corresponding to projects completed by the professional in the specified time period. The method also generates a report of the calculated total points earned by the professional. This total can be used by management to evaluate the performance of the professional, for employee management, and/or for human resource planning within the firm.

The menu of project codes may include codes corresponding to billable projects routinely performed for clients of the service firm and/or codes corresponding to non-billable projects routinely performed for the general benefit of the firm. The database may further include a set of point requirement totals assigning a point requirement to each employee identifier. Using these point requirement totals, the method may generate a report comparing the calculated total points earned by the professional to the point requirement total assigned to the employee identifier of the professional. The database may have a list of projects including a set of project records. Each project record includes an employee identifier selected from the list of employee identifiers and a project code selected from the list of project codes. The total points earned by a professional in a specified time period may then be calculated by selecting a subset of the list of projects corresponding to projects completed by the employee in a specified time period and adding point values corresponding to project codes of the selected projects completed by the employee.

The database may include a set of fixed fees assigning a monetary value to billable project codes. An invoice including service charges to a client for completed projects may then be generated by adding fixed fees assigned to billable project codes corresponding to the billable projects. The database may also include a list of client identifiers, a set of fixed fees assigning a monetary value to billable project codes, and a list of projects comprising a set of project records. Each project record includes an employee identifier selected from the list of employee identifiers, a client identifier selected from the list of client identifiers and a project code selected from the list of project codes. A subset of the list of projects corresponding to billable projects having a specified client identifier may then be selected, and an invoice generated containing the selected subset of projects and associated fixed fees.

It will be appreciated that the database may contain other useful information. Projects may have associated start dates, completion dates, and status. Employees may have associated contact information, employment status, and social security number. Clients may have associated contact information, entity status, and other useful data. These additional forms of information may be used in combination with the basic functionality of the project-based point system database in ways that are analogous to how they are used in other project management and accounting database systems.

DETAILED DESCRIPTION

Figure 1:
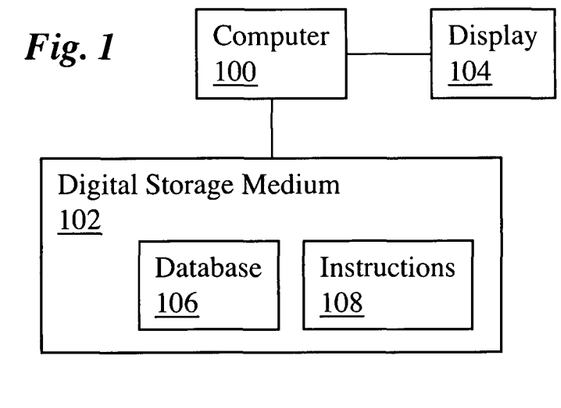
FIG. 1 is a block diagram of a system for implementing a project-based point system according to an embodiment of the present invention.

According to one embodiment of the invention, a project-based point system is implemented using a computer 100, digital storage medium 102, and display 104, as shown in FIG. 1. Digital storage medium 102 stores a database 106 together with instructions 108, such as scripts, to generate user interfaces, perform database searching, report generation, and so on. The database 106 comprises several tables: an employee list, a billable project menu, a non-billable project menu (a.k.a. reward project menu), and a project list. The database may also include additional tables such as a client entity list, a client contact list, a list of cases, and other lists.

The employee list contains a record for each employee. Each record in this table contains several fields: a unique employee ID, an employee name, a minimum number of points the employee is required to earn per month, and a monthly salary for the employee.

| | EMPLOYEE LIST | | |
|---|---|---|---|
| ID | Name | Point Min. | Salary |
| RJ | Robert Jones | 120 | $3000 |
| MA | Mike Adams | 120 | $3000 |
| TM | Tim Miles | 100 | $2500 |
| KS | Kim Sawyer | 140 | $3500 |
| JS | John Smith | 110 | $2800 |
| BS | Brian Stone | 110 | $2900 |
| KB | Kevin Brown | 100 | $2200 |
| BL | Bill Long | 130 | $3200 |
| GK | Gene Keller | 100 | $2300 |

The employee ID used in this example is a two-letter code representing the initials of the employee name. A numerical or other unique ID could alternatively be used, but the initials are more easily associated with the employee name. The employee name is not necessary but is helpful in generating reports that are understood without knowledge of which ID is associated with which employee. Alternatively, the employee name itself could be used as the ID. The minimum number of points field is not necessary but enables automatic comparison of computed point totals with the employee's required minimum. The salary field is not necessary but is shown to emphasize that the employees earn a base monthly salary. The employee list may also contain other fields such as employee start date, employee contact information, employee job title, and other employee-related information.

The client list contains a list of clients served by the firm. Each record in the list contains two fields: a client ID field and a client name field.

CLIENT LIST

| Client ID | Client Name |
|---|---|
| LUM | Luminary Associates |
| PEN | Pendulum Research |
| IBM | InterBrain Machines |

The client ID field preferably contains a short acronym or abbreviation of the full client name. However, the client ID may be any other type of unique identifier such as a number or other code. The client name field is not necessary but is included to facilitate the generation of reports and invoices. The client list may also contain other optional fields such as client contact information, client type, client status, and other client related information.

The project menu is a list of projects routinely performed by professional employees of the firm. Projects may be classified as billable (i.e., performed for a client and thus billable to the client) or non-billable (i.e., performed for the general benefit of the firm, and not billable to a client). In either case, a project is a package of tasks that results in the production of a well-defined deliverable. A deliverable, therefore, is a product delivered to the firm, or to a client of the firm, that is the result of the performance of a service by an employee of the firm.

The billable project menu is a list of standard services that are routinely performed by employees for the firm's clients. Each record in this table corresponds to a predefined project and contains several fields: a project code, a project description, a fixed number of points, and a fixed fee.

BILLABLE PROJECT MENU

| Code | Description | Points | Fee |
|---|---|---|---|
| APPL | Preparation and filing of non-provisional patent application | 25 | $3000 |
| PROV | Preparation and filing of provisional patent application | 15 | $2500 |
| OPIN | Patentability opinion | 6 | $ 800 |
| SRCH | Prior art search | 2 | $ 300 |
| RESP | Response to an Office Action | 6 | $ 800 |

The project code is preferably a short acronym or abbreviation that is easily associated with the longer project description. The code could, however, be a number or another unique code. The project description field is not necessary but is helpful when generating reports or invoices. The description could be used as the project code, but it is preferable to have separate fields for the project code and description in case the description needs to be modified. The project points represent a predetermined point-value associated with the project. The point value represents an equitable valuation of the project internally within the firm. It may represent a combination of skill level required to work on the project, level of expertise required for the project, average time required to complete the project, and other project-specific factors related to the valuation of the project internal to the firm. The project fee field is not necessary but is useful in embodiments wherein the system is also used to generate invoices to clients. The value of the fee field represents the value customarily charged to a client of the firm for performing the project for the client. The specific fee value may be determined by various factors such as the market valuation given to similar services provided by other firms, the internal costs to provide the service (including both human resources, overhead costs, and project specific fees incurred). Note also that there may be two or more sets of fees, each representing a tier of clients. For example, the fee charged to academic clients (or non-profit clients, not-for-profit clients, etc.) for performing a given project may be slightly less than the fee charged to corporate clients for the same project. A pro bono client would be charged no fee. These different fee structures would thus be represented as additional columns of the billable project menu. In addition, it will be appreciated that the flat fee is not necessarily proportional to the points, thereby allowing independent adjustment to account for differences between internal employee management factors and external client and market factors. In contrast, a billable hour system does not allow such flexibility since the number of hours worked internally is proportional to the fee charged externally.

The non-billable project menu is a list of standard activities that are routinely performed by employees for the firm or for the professional development of an employee. These activities, in other words, are not performed for clients and thus are not billable to clients. Each record in this table corresponds to a predefined project and contains several fields: a project code, a project description, and a fixed number of points. Since these projects are not billable to clients, there is no field representing a fee.

NON-BILLABLE PROJECT MENU

| Code | Description | Points |
|---|---|---|
| NEWCL | Market, negotiate, and engage with new client | 20 |
| ASSIST | Assist coworker with a project | 2 |

As with the billable project menu, in the non-billable project menu the project code is preferably a short acronym or abbreviation that is easily associated with the longer project description. The code could, however, be a number or another unique code. The project description field is not necessary but is helpful when generating reports. These projects do not appear on invoices. The project points represent a predetermined point-value associated with the project. The point value represents an equitable valuation of the project internally within the firm. It may represent a combination of skill level required to work on the project, level of expertise required for the project, average time required to complete the project, and other project-specific factors related to the valuation of the project internal to the firm. In particular, for these non-billable projects, the valuation may be related to the benefit brought to the firm by the employee who performs the project. For example, bringing in a repeat customer for a new project, bringing in a new client, participating in professional development, assisting or supervising another employee, or performing other business or professional development activities that benefit the firm or employee are all activities that are valuable to the firm without directly being billable to clients.

The project list contains a list of actual projects performed (or scheduled to be performed) by employees of the firm for clients of the firm. Each record of the list contains four fields:

a project code field, an employee ID field, a client ID field, a case ID field, and a project status field.

| FIRM PROJECT LIST | | | | |
|---|---|---|---|---|
| Project Code | Employee ID | Client ID | Case ID | Status |
| APPL | RJ | LUM | LUM-123 | Active |
| PROV | TM | LUM | LUM-234 | Completed |
| APPL | MA | PEN | PEN-111 | Cancelled |
| SRCH | TM | PEN | PEN-112 | Completed |
| NEWCL | MA | | | Active |
| ASSIST | RJ | | | Completed |
| APPL | MA | IBM | IBM-140 | Active |
| OPIN | TM | LUM | LUM-101 | Completed |

The project code field contains a project code taken selected from the billable project menu or the non-billable project menu. The employee ID contains an employee ID selected from the employee list. The client ID field contains a client ID selected from the client list. The case ID is an optional field which may be used to classify all the projects performed for a client according to a case or docket. The case ID may be formed by concatenating the client ID with a case number, as in the example shown, or by assigning a unique global case number. Note that the non-billable projects shown do not have client ID values since these cases are not performed for clients. In some embodiments where internal projects are classified, these projects may have case ID values. The project status field is used to indicate the current status of the project. For example, it may be used to indicate whether the project is active (i.e., in progress), completed, or cancelled prior to completion. The project list may optionally contain other fields as well, such as received date, completion date, deadline date, secondary employee, and project notes.

Figure 2:
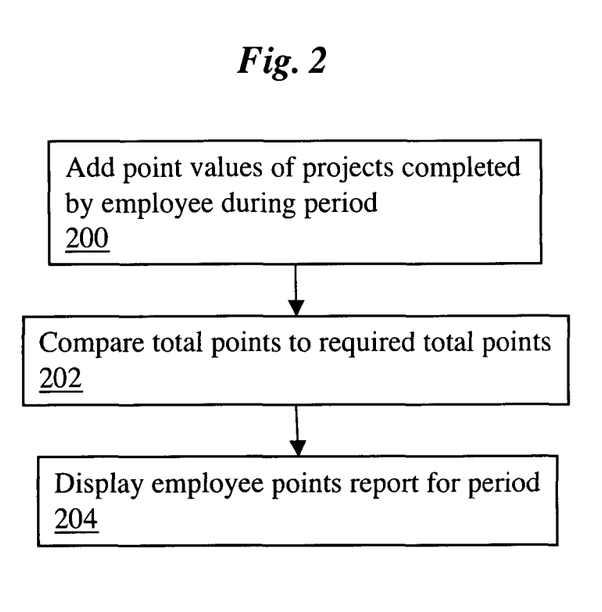
FIG. 2 is a flow chart of a process for generating a report of earned points according to an embodiment of the present invention.

In a preferred embodiment of the invention, a conventional user interface is provided as part of instructions 108 to allow the above lists to be edited and viewed. It will be appreciated, however, that computer 100 may be a database server and database client applications can be used to provide multiple authorized users on a computer network (not shown) to access and/or update the database 106 remotely. Instructions 108 containing several programs or scripts may be associated with the database to allow users to perform searches of the database, sort records, and to view the search results in various formats. For example, a search of the project list can be performed to find all projects with an active status that are being performed by a specified employee. The resulting projects can then be sorted by one or more criteria and displayed to provide an active project list for each employee. FIG. 2 illustrates another script which adds up the point values of all projects completed by a specified employee in a specified time period (step 200), compares the total points for the completed projects with the required total points for the employee (step 202), and displays a report containing the comparison (step 204). The total points may be calculated, for example, by first performing a search of the project list to find those projects whose status is 'completed', whose employee ID corresponds to the selected employee, and whose date of completion falls within the specified time period. The records found will then determine a set of project codes with corresponding fixed point values given by the menu of projects. These fixed point values can then be added up to yield the total points earned. The following table illustrates an example of a monthly report of completed projects and total points earned for a single employee.

| MONTHLY REPORT OF TOTAL POINTS EARNED - SINGLE EMPLOYEE: RJ | | | |
|---|---|---|---|
| Project Code | Points | Case ID | Date Completed |
| REV | 2 | LUM-107/PCT | Jul. 1, 2005 |
| RESP | 6 | LUM-109/US | Jul. 6, 2005 |
| SPROV | 3 | PEN-111/PROV | Jul. 6, 2005 |
| IF | 1 | PEN-102/US | Jul. 7, 2005 |
| IF | 1 | IBM-104/CON | Jul. 7, 2005 |
| CON | 1 | ABC-115/US | Jul. 7, 2005 |
| SAM | 2 | ABC-121/CIP | Jul. 7, 2005 |
| SPROV | 3 | IBM-140/PROV | Jul. 12, 2005 |
| APPL | 25 | LUM-131/US | Jul. 21, 2005 |
| Total: | 44 | | |

By repeating the above script for multiple months, a summary year-to-date report for the employee can be generated, which may include columns comparing the actual earned points to the required points.

| YTD REPORT OF TOTAL POINTS EARNED - SINGLE EMPLOYEE: RJ | | | | | |
|---|---|---|---|---|---|
| Month | Hand. Points | Sup. Points | Total Earned | Point Min. | Difference |
| JAN | 76 | 2 | 78 | 100 | −22 |
| FEB | 97 | 1 | 98 | 100 | −2 |
| MAR | 153 | 2 | 155 | 100 | 55 |
| APR | 21 | 1 | 22 | 100 | −78 |
| MAY | 150 | 1 | 151 | 100 | 51 |
| JUN | 123 | 3 | 126 | 100 | 26 |
| Total: | 620 | 10 | 630 | 600 | 30 |

The difference between the total earned points and the minimum required points can be calculated simply by subtracting the required point value for the employee from the calculated total. This script can be used by an employee or manager to evaluate an employee's progress toward a required point minimum. As illustrated in the example above, the total points earned by the employee each month may differ significantly from the minimum required points per month. In particular, in April the employee took a vacation and earned only 22 points. However, the employee earned 55 extra points the previous month and 51 extra points the month following the vacation. In the six-month period shown, the employee averaged 105 points per month. This example illustrates how an employee can manage his or her own time, subject only to the requirement that the average number of points earned over several months remains above the required minimum.

In addition, the script described above could be repeatedly executed by another script to compute the total points earned for each employee in the firm in a specified time period and comparing the computed total points earned with the employee's required point minimum, generating the report shown below.

MONTHLY REPORT OF TOTAL POINTS
EARNED - FIRM SUMMARY

| Employee | Total Points | Point Min. | Difference |
|---|---|---|---|
| RJ | 133 | 120 | +13 |
| TM | 87 | 100 | -13 |
| MA | 121 | 120 | +1 |
| BL | 142 | 130 | +12 |
| KS | 149 | 140 | +9 |
| JS | 109 | 110 | -1 |
| GK | 103 | 100 | +3 |
| BS | 83 | 110 | -17 |
| KB | 105 | 100 | +5 |

As illustrated by the report, most employees earned a total number of points greater than their required minimum. A few employees, however, earned fewer points than required. This automatically generated report thus provides a manager with a convenient overview of the performance of all the employees during the specified time period. This information can then be used by the manager to make appropriate management decisions. For example, a manager might decide to give a bonus to an employee who exceeds the required number of points, or to give an unfavorable employee evaluation to an employee who fails to meet the required number of points. In addition to the simplicity of this report, it should be emphasized that the use of this project-based point system for internal management takes into consideration not only the billable work performed by employees, but also the non-billable work performed. Thus, employees have an incentive to not only perform work specifically for clients, but also perform activities of more general benefit to the firm. By appropriate selection and periodic adjustment of non-billable projects and their valuations, firms can customize the incentives to optimize the balance of billable and non-billable activities that employees are motivated to perform. In addition, an employee who earns a large number of points by performing activities of benefit to the firm may be rewarded with a promotion.

Figure 4:
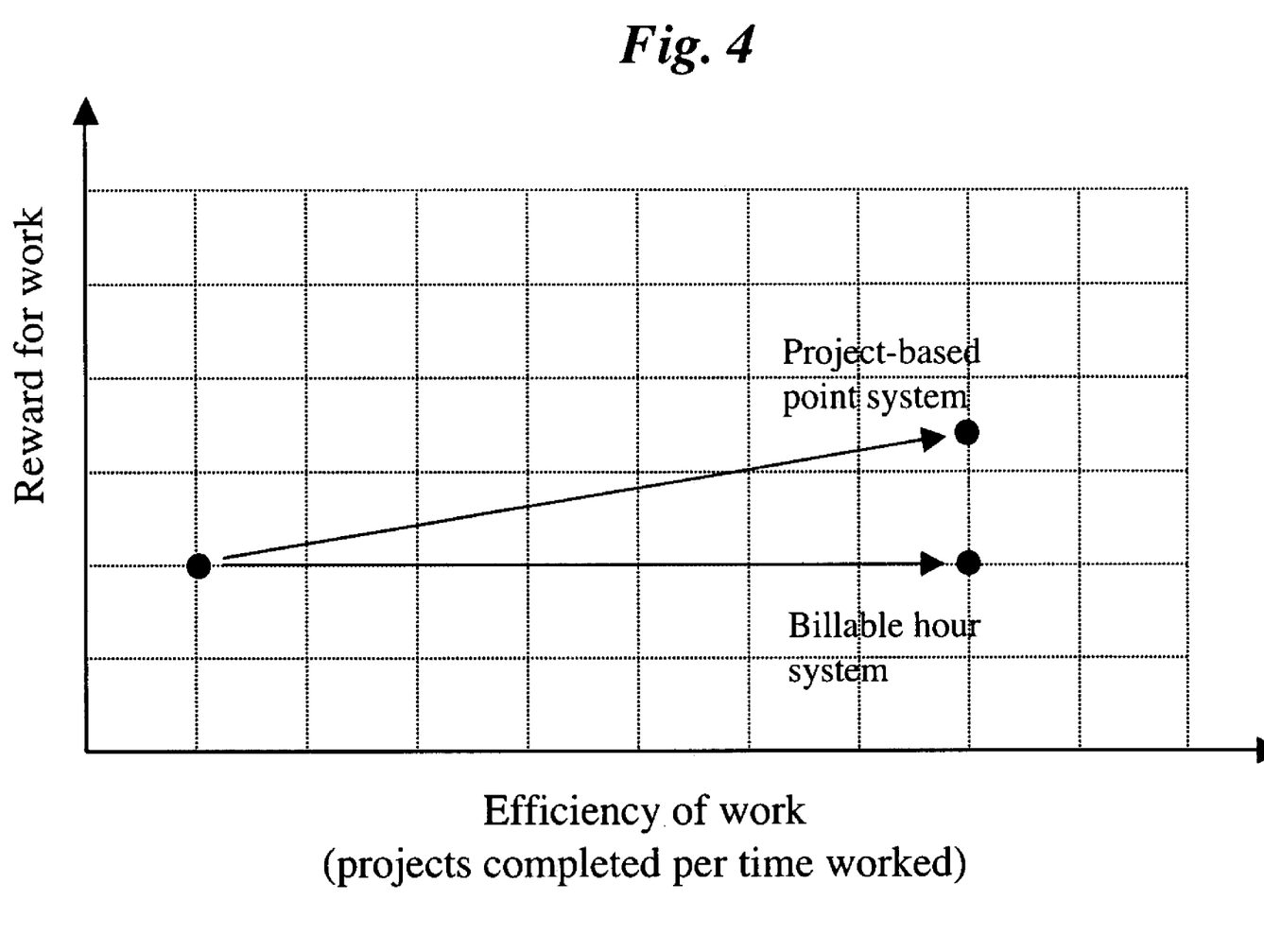
FIG. 4 is a graph of employee reward vs. efficiency for a billable hour system and for a project-based point system according to an embodiment of the present invention.

Employees are provided with the opportunity to self-manage their work within the context of the project-based point system. They may earn their required points by any combination of billable and non-billable projects, and may control their own work schedule to a large degree. In some cases, management may allow excess points to roll over into the next time period, so that employees may build up a reserve of extra points to be used in the future. The project-based point system also provides incentives to employees to work efficiently. As illustrated in FIG. 4, in the project-based point system, as an employee becomes more efficient (i.e., completes more projects in a given time), the employee earns more points and is rewarded accordingly. In contrast, in the billable hour system, as an employee becomes more efficient (i.e., completes more projects in a given time), they work the same number of hours and receive the same reward. They are thus not provided any incentive for their increased efficiency.

Figure 5:
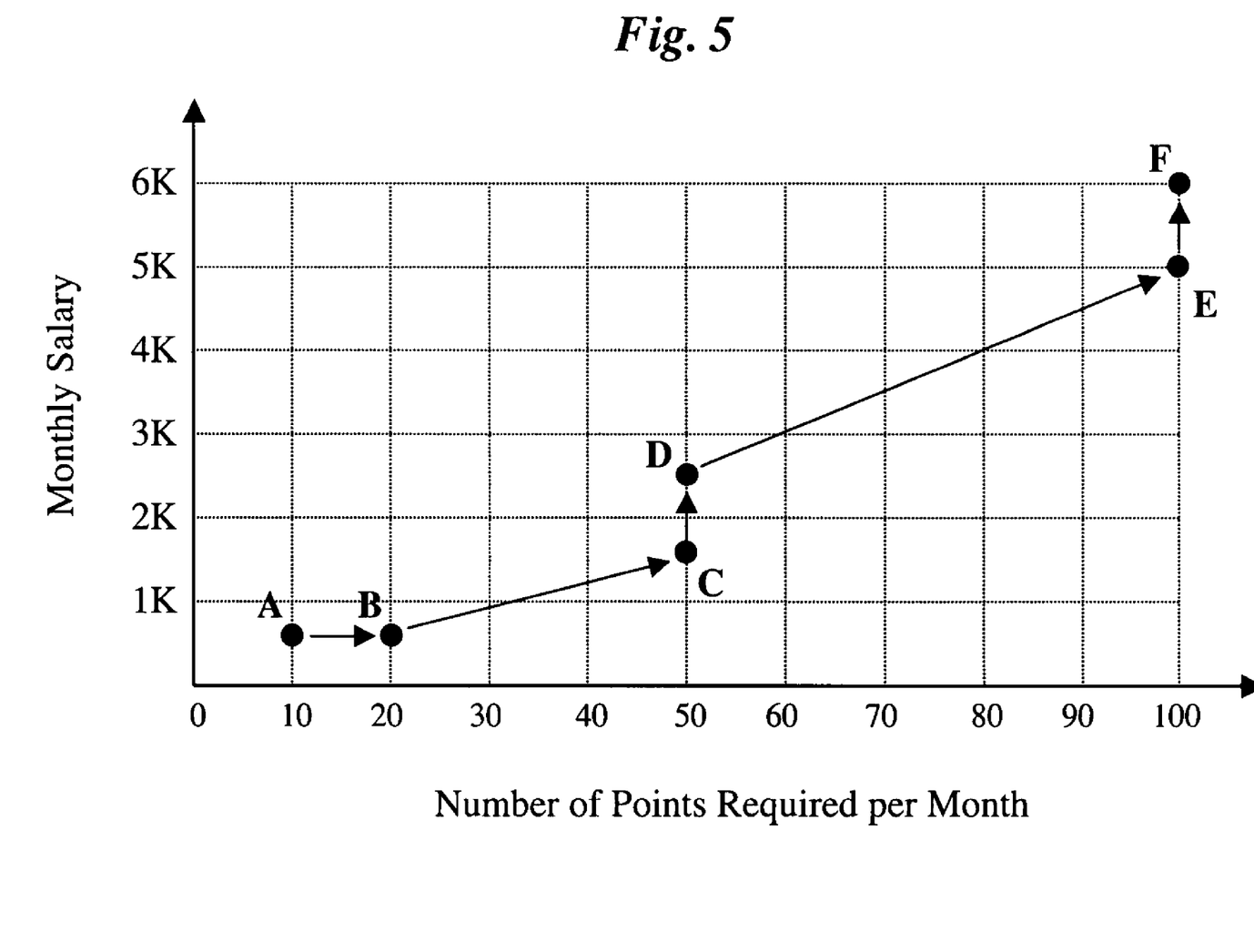
FIG. 5 is graph of employee salary vs. point requirement for an employee at different stages in employee career development at a firm using a project-based point system according to an embodiment of the present invention.

FIG. 5 illustrates how salary and minimum monthly point requirements for an employee may be adjusted to manage an employee in the project-based point system. In this example, an employee begins at dot A in the graph which represents a part-time trainee position requiring completion of 10 points per month. After completing training, the employee becomes more efficient and is required to complete 20 points per month, as shown at dot B in the graph. After several months, the employee transitions to 50 points per month (dot C) and the monthly salary increases to reflect this increased point requirement. After one year, the employee receives a favorable evaluation and receives a raise in salary, while remaining at the same point requirement (dot D). A few months later, the employee transitions to 100 points per month (dot E) with a corresponding increase in salary. At the end of the year, the employee again receives a favorable evaluation and receives a salary raise (dot F) while remaining at a 100 point requirement. As this example illustrates, the salary and point requirements can be independently adjusted to suit the changing circumstances as a given employee advances.

Figure 3:
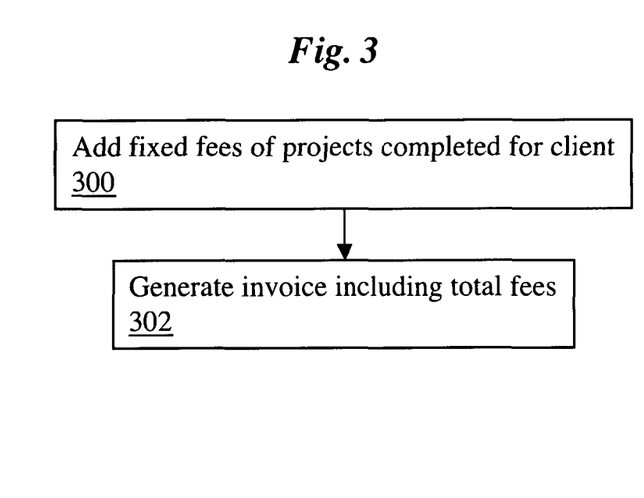
FIG. 3 is a flow chart of a process for generating invoices according to an embodiment the present invention.

In another embodiment, the system is supplemented by the ability to generate invoices to clients for completed projects. As illustrated in FIG. 3, a script can add fixed fees of projects completed for a client (step 300) and then generate an invoice including a total of the fixed fees for the completed projects (step 302), such as the invoice shown below.

INVOICE FOR SERVICES COMPLETED

| Project Code | Description | Fee |
|---|---|---|
| APPL | Regular Appl. | $3000 |
| PTOFEE | Filing fees paid to Patent Office on behalf of client | $ 500 |
| | TOTAL: | $3500 |

The total fees can be calculated by performing a search of the project list that selects a subset of projects whose type is 'billable', whose status is 'completed' and whose client ID is the specified client. The selected subset of projects determines a set of project codes which have corresponding fixed fees. These corresponding fees are then added to calculate the total fees. Repeated use of this script for various clients can generate a collection of invoices.

The invention claimed is:

1. A computer-implemented method comprising:
 a) storing by a computer in a computer-readable digital storage medium a database comprising:
  i) a list of employee identifiers corresponding to salaried professionals employed for multiple time periods by a service firm and paid a salary,
  ii) a menu of project codes corresponding to predefined projects routinely performed by the professionals of the service firm, wherein the predefined projects comprise billable and non-billable projects,
  iii) a set of point values assigning a fixed point value to each of the project codes corresponding to the billable and non-billable projects, wherein the point values represent valuations within the service firm of the predefined projects, and
  iv) a set of point requirement totals assigning a point requirement to each employee identifier for each of the multiple time periods wherein the salary of each salaried professional is related to the point requirement total assigned to the employee identifier corresponding to the salaried professional; and
  v) a set of project records, wherein each project record comprises an employee identifier selected from the list of employee identifiers and a project code selected from the list of project codes;
 b) for each of the time periods, calculating by the computer total points earned by a professional by adding point values assigned to project codes corresponding to billable and non-billable projects completed by the professional during the time, wherein the point values are earned by the professional irrespective of time spent by the professional on the corresponding billable and non-billable projects completed; and c) generating by the computer a summary report of the calculated total points earned by the professional over multiple time periods, wherein the summary report comprises a point difference between the point requirement total for the professional and the total points earned by the professional over the multiple time periods, whereby the performance of the professional may be evaluated.

2. The method of claim 1 wherein the menu of project codes comprises codes corresponding to projects routinely performed for clients of the service firm.

3. The method of claim 1 wherein the menu of project codes comprises codes corresponding to projects routinely performed for the general benefit of the firm.

4. The method of claim 1 wherein the database comprises a list of projects comprising a set of project records, wherein each project record comprises an employee identifier selected from the list of employee identifiers and a project code selected from the list of project codes, wherein calculating total points earned by a professional in a specified time period comprises selecting a subset of the list of projects corresponding to projects completed by the employee in a specified time period and adding point values corresponding to project codes of the selected projects completed by the professional.

5. The method of claim 1 wherein the database further comprises a set of fixed fees assigning a monetary value to billable project codes, and wherein the method further comprises generating an invoice comprising service charges to a client for completed projects by adding fixed fees assigned to billable project codes corresponding to the billable projects.

6. The method of claim 1 wherein the database further comprises a list of client identifiers, a set of fixed fees assigning a monetary value to billable project codes, and a list of projects comprising a set of project records, wherein each project record comprises an employee identifier selected from the list of employee identifiers, a client identifier selected from the list of client identifiers and a project code selected from the list of project codes, wherein the method further comprises selecting a subset of the list of projects corresponding to billable projects having the specified client identifier, and generating an invoice containing the selected subset of projects and associated fixed fees.

7. A digital storage medium tangibly embodying machine-readable instructions executable by a computer, the instructions comprising:

a) storing by a computer in a computer-readable digital storage medium a database comprising:

i) a list of employee identifiers corresponding to salaried professionals employed for multiple time periods by a service firm and paid a salary, ii) a menu of project codes corresponding to predefined projects routinely performed by the professionals of the service firm, wherein the predefined projects comprise billable and non-billable projects, iii) a set of point values assigning a fixed point value to each of the project codes corresponding to the billable and non-billable projects, wherein the point values represent valuations within the service firm of the predefined projects, and iv) a set of point requirement totals assigning a point requirement to each employee identifier for each of the multiple time periods wherein the salary of each salaried professional is related to the point requirement total assigned to the employee identifier corresponding to the salaried professional; and v) a set of project records, wherein each project record comprises an employee identifier selected from the list of employee identifiers and a project code selected from the list of project codes;

b) for each of the time periods, calculating by the computer total points earned by a professional by adding point values assigned to project codes corresponding to billable and non-billable projects completed by the professional during the time, wherein the point values are earned by the professional irrespective of time spent by the professional on the corresponding billable and non-billable projects completed; and c) generating by the computer a summary report of the calculated total points earned by the professional over multiple time periods, wherein the summary report comprises a point difference between the point requirement total for the professional and the total points earned by the professional over the multiple time periods, whereby the performance of the professional may be evaluated.

8. The digital storage medium of claim 7 wherein the menu of project codes comprises codes corresponding to projects routinely performed for clients of the service firm.

9. The digital storage medium of claim 7 wherein the menu of project codes comprises codes corresponding to projects routinely performed for the general benefit of the firm.

10. The digital storage medium of claim 7 wherein the database comprises a list of projects comprising a set of project records, wherein each project record comprises an employee identifier selected from the list of employee identifiers and a project code selected from the list of project codes, wherein calculating total points earned by a professional in a specified time period comprises selecting a subset of the list of projects corresponding to projects completed by the employee in a specified time period and adding point values corresponding to project codes of the selected projects completed by the professional.

11. The digital storage medium of claim 7 wherein the database further comprises a set of fixed fees assigning a monetary value to billable project codes, and wherein the digital storage medium further comprises instructions for generating an invoice comprising service charges to a client for completed projects by adding fixed fees assigned to billable project codes corresponding to the billable projects.

12. The digital storage medium of claim 7 wherein the database further comprises a list of client identifiers, a set of fixed fees assigning a monetary value to billable project codes, and a list of projects comprising a set of project records, wherein each project record comprises an employee identifier selected from the list of employee identifiers, a client identifier selected from the list of client identifiers and a project code selected from the list of project codes, wherein the digital storage medium further comprises instructions for selecting a subset of the list of projects corresponding to billable projects having a specified client identifier, and generating an invoice containing the selected subset of projects and associated fixed fees.

* * * * *